S. M. SCHAEFLE.
TRAY HOLDER.
APPLICATION FILED OCT. 24, 1908.
912,035. Patented Feb. 9, 1909.
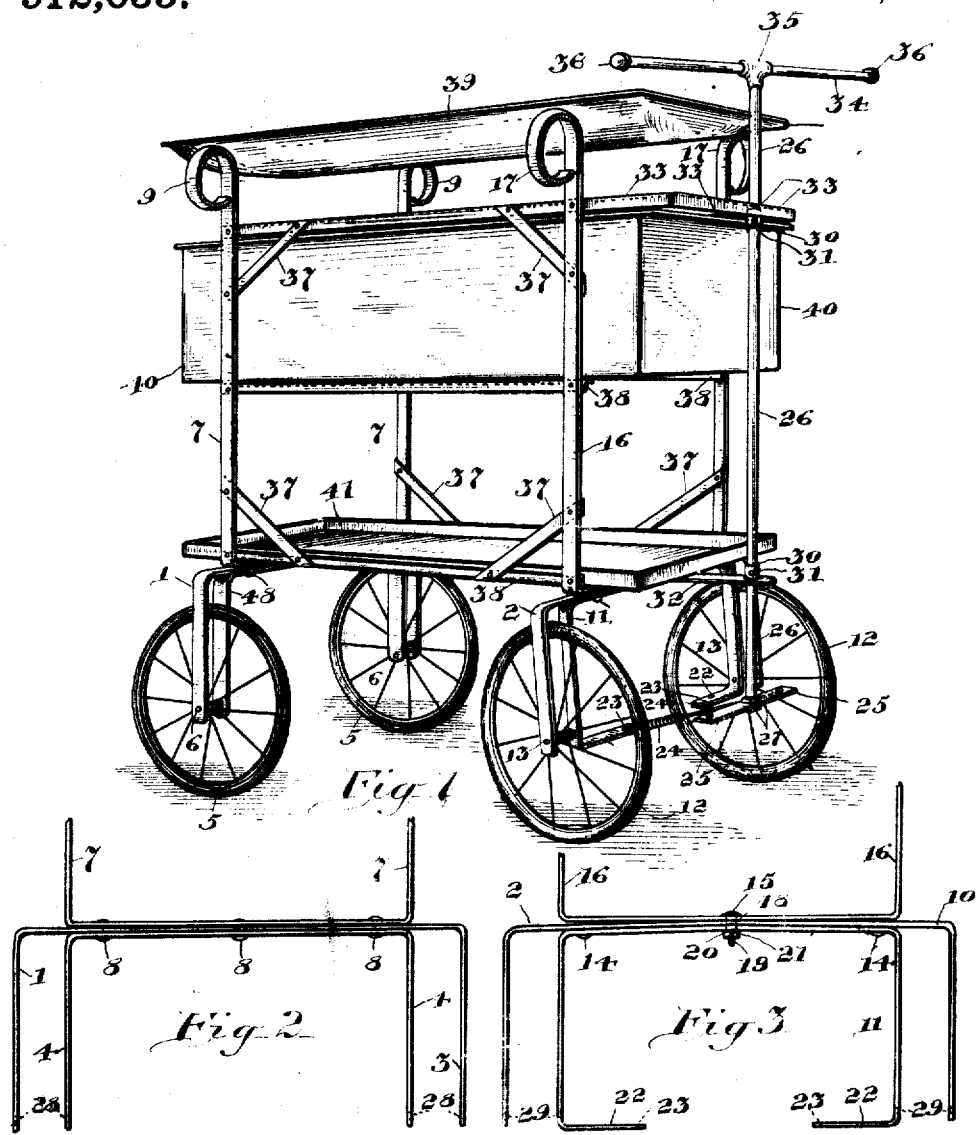

UNITED STATES PATENT OFFICE.

SIMON M. SCHAEFLE, OF NAPERVILLE, ILLINOIS.

TRAY-HOLDER.

No. 912,085.   Specification of Letters Patent.   Patented Feb. 9, 1909.

Application filed October 24, 1908. Serial No. 459,416.

*To all whom it may concern:*

Be it known that I, SIMON M. SCHAEFLE, a citizen of the United States, residing at Naperville, county of Dupage, and State of Illinois, have invented certain new and useful Improvements in Tray-Holders, of which the following is a specification.

My invention relates to improvements in tray-holders, and has for its object to provide a wheeled carriage for transporting food to be served from place to place in the dining-rooms of hotels and other public places where meals are served, also for use in hospitals and private dwellings where food is served to patients and invalids.

A further object of my invention is to provide means on the tray-holder for carrying dishes, towels and other articles. And a further object of my invention is to provide adequate steering means in the tray-holder.

Other objects will appear hereinafter.

With these objects in view, my invention consists in a wheeled tray-holder comprising an adjustable steering means which may be set at any desired angle to cause the movement of the tray-holder to be in a certain direction until the steering means is again adjusted; for instance, if the steering means is set for the tray-holder to move in a straight direction, the same will travel in a straight course even when given sufficient momentum to run by itself.

My invention further consists in frictional means for holding the adjustment of the steering means.

My invention further consists in resilient means in the steering mechanism whereby the steering wheels may strike a small obstruction and rebound to their former position without interfering with the adjustment of the steering means. And my invention further consists in certain details of construction and arrangement of parts all as will be hereinafter fully described and particularly pointed out in the claims.

My invention will be more readily understood by reference to the accompanying drawings forming a part of this specification, and in which, Figure 1 is a perspective view of my tray-holder in its preferred form, Figs. 2 and 3 are detail elevations showing the front and rear wheel supporting frame constructions, respectively, and Fig. 4 is a detail top elevation showing the action of the resilient members of the steering mechanism.

Referring now to the drawings, 1 indicates the front wheel supporting frame and 2 the rear wheel supporting frame of the tray-holder. The front wheel supporting frame 1 comprises a top member 3 and a bottom member 4, the former extending horizontally and downwardly on the outside of the wheels 5 and the latter riveted to the member 3 and extending horizontally and downwardly inside of the wheels 5, said members terminating at and adapted to receive the wheel axles 6. A body frame 7 having horizontally and vertically extending portions is secured to the frame 1, the rivets 8 forming the connecting means. The vertical portions of the frame 7 terminate in outwardly extending loops 9 which are adapted to hold towels or other similar articles.

The rear wheel supporting frame comprises a top member 10 and a bottom member 11, the former extending horizontally and downwardly outside the wheels 12 and the latter secured to the member 10 and extending horizontally and downwardly inside the wheels 12, said members being adapted to receive the wheel axles 13. The members 10 and 11 are secured together by means of the rivets 14, and a bolt 15 passing through the members 10 and 11 forms a pivotal connection between the frame 2 and the body frame 16. The frame 16 consists of horizontally and vertically extending portions, the latter terminating in loops 17 similar to the loops 9 in the frame 7. The bolt 15 comprises a portion 18 and a reduced threaded portion 19 the shoulder 20 forming a stop for the nut 21. The inwardly extending portions 22 in the member 11 are provided with perforations 23 to receive resilient members or springs 24, the latter being adapted to cross and attach to a cross-arm 25 rigidly secured to the lower extremity of the steering column 26. Nuts 27 threaded to the steering column 26 are disposed above and below the cross-arm 25 and are adapted to rigidly secure the same to said steering column. The wheel axles 6 are secured in the perforations 28 in the frame 1, and the axles 13 are secured in the perforations 29 in the frame 2.

Collars 30 provided with set-screws 31 are secured to the steering column 26, said collars being disposed between a rearwardly extending supporting arm 32 and the rearwardly extending U-shaped member 33, said steering column being journaled in said arm and in said member in such a manner as to have a large degree of frictional resistance against rotation. Consequently when the steering handle 34 secured to the steering column 26 by means of the coupling 35 is turned into position, the column 26 is held so adjusted by means of the frictional resistance in its bearings. The wheels 12 may pass over any small obstacle and not in the least affect the steering because of the resiliency of the springs 24. The springs 24 are crossed as shown in order to prevent confusion on the part of the person steering the tray-holder. The arm 32 is secured in the frame in any suitable manner. Knobs 36 are provided at the extremities of the handle 34, and braces 37 are provided to reinforce the body frame. Side L-shaped frame members 38 are disposed as shown, and are adapted to form slides. The member 33 is L-shaped in cross section similar to members 38, all of said members being securely riveted to the body frames 7 and 16.

The food-tray 39 is adapted to rest on the loops 9 and 17 and the dish receptacle 40 to rest on the slides 38. The tray 41 is adapted to receive miscellaneous articles, and which together with the food-tray 39 and the dish receptacle 40, is removably mounted.

While I have shown what I deem to be the preferable form of my invention, I do not wish to be limited thereto as there might be many changes made in the details of construction and arrangements of parts without departing from the spirit of my invention.

Having described my invention what I claim as new and desire to secure by Letters Patent, is:

1. A tray-holder, in combination with front and rear wheeled frames and a body frame supported thereby, rearwardly extending members in said body frame, a vertically disposed steering column journaled in said members, means for rotating said steering column, and a cross-arm secured at the lower extremity of said steering column, and resilient means connecting the said cross arm with the rear wheel frame, substantially as described.

2. In a tray-holder, in combination with front and rear wheeled frames and suitable body or tray-holding frames connected thereto, the front wheeled frame comprising top and bottom horizontally disposed members secured together having portions extending downwardly outside and inside the connected wheels, respectively, the rear wheeled frame comprising top and bottom horizontally disposed members secured together having portions extending downwardly outside and inside the connected wheels, respectively, inwardly extending portions integral with the last-named bottom member, a suitably mounted vertically disposed steering column having a cross-arm at its lower extremity, and resilient means connecting the extremities of said cross-arm with the extremities of said inwardly extending portions, substantially as described.

3. In a tray-holder, body frames and front and rear wheeled frames adapted to support the same, a vertically disposed steering column provided with a suitable handle journaled in upper and lower rearwardly extending portions of said body frames, a frictional resistance against rotation of the steering column provided in the bearings of the same, collars secured to said steering column to properly position same, a cross-arm secured to the lower extremity of said steering column, and obliquely disposed crossed helical springs connecting the extremities of said cross-arm with the rear wheeled frame, substantially as described.

4. In a tray-holder, front and rear wheeled frames and front and rear body frames connected thereto, respectively, each body frame comprising horizontally and vertically extending portions provided with loops at their upper extremities, L-shaped longitudinal members constituting slides connecting said body frames, and suitably arranged reinforcing corner braces, substantially as described.

In testimony whereof I have signed my name to this specification in the presence of two subscribing witnesses.

SIMON M. SCHAEFLE.

Witnesses:
JANET E. HOGAN,
HELEN F. ELLIS.